No. 694,407. Patented Mar. 4, 1902.
G. E. McELROY.
SPEED CHANGING GEAR.
(Application filed Apr. 12, 1901.)
(No Model.) 2 Sheets—Sheet 1.
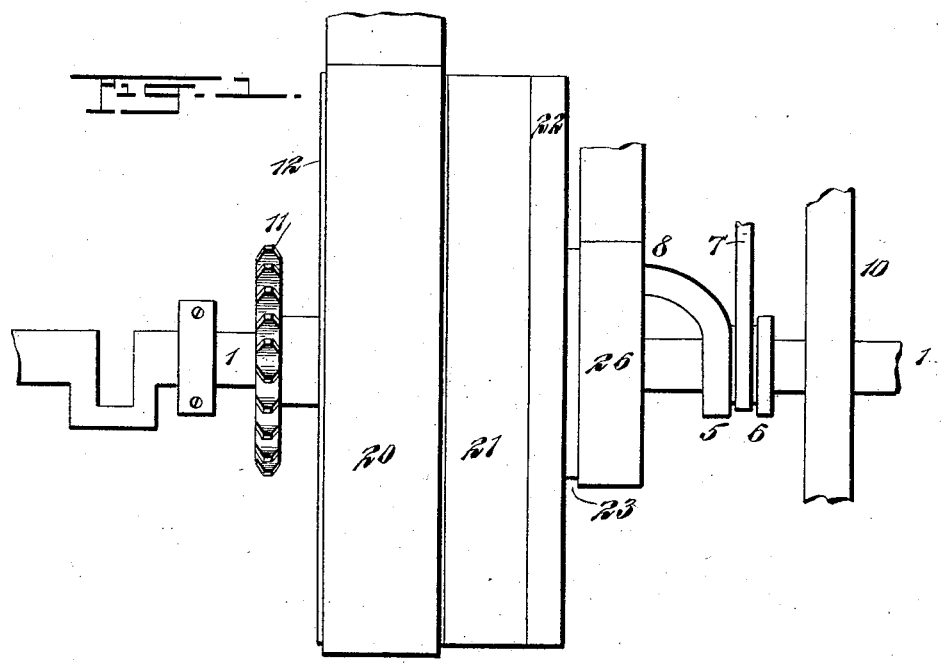
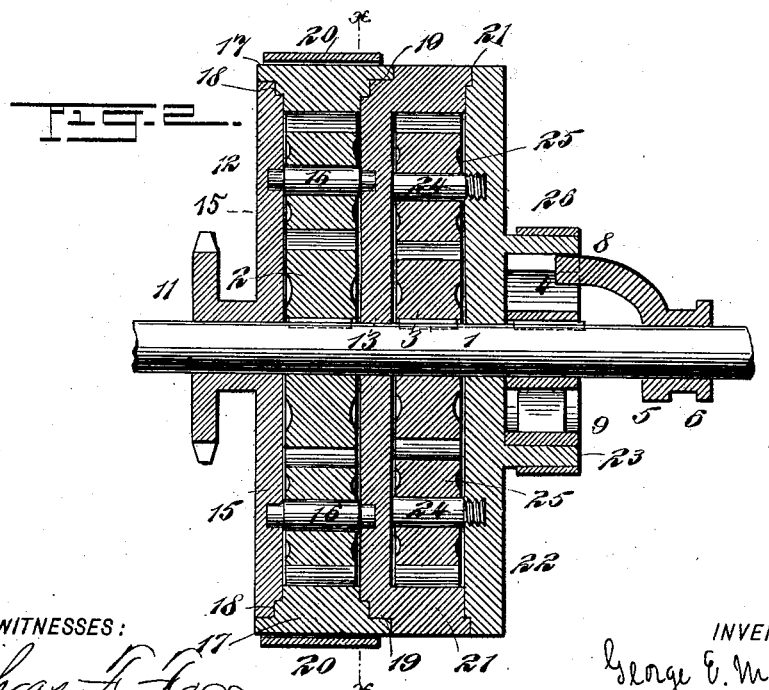
WITNESSES:
Chas. F. Fogg
C. A. Pierce
INVENTOR
George E. McElroy,
BY
A. M. Pierce,
ATTORNEY.

No. 694,407. Patented Mar. 4, 1902.
G. E. McELROY.
SPEED CHANGING GEAR.
(Application filed Apr. 12, 1901.)
(No Model.) 2 Sheets—Sheet 2.
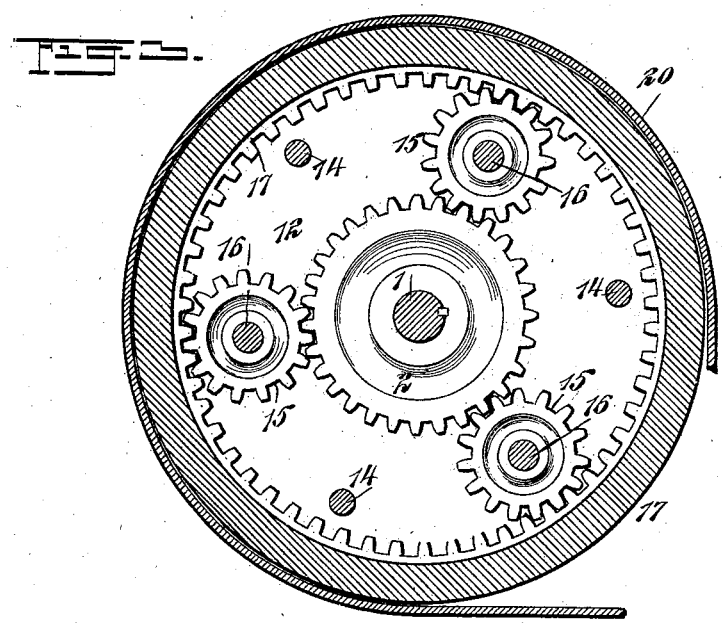
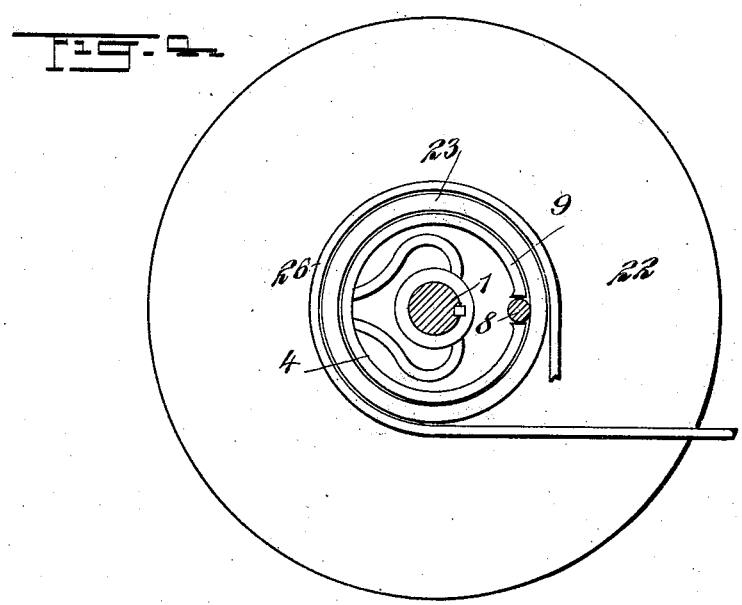
WITNESSES: INVENTOR
George E. McElroy,
BY A. M. Pierce,
ATTORNEY.

UNITED STATES PATENT OFFICE.

GEORGE E. McELROY, OF NEW YORK, N. Y.

SPEED-CHANGING GEAR.

SPECIFICATION forming part of Letters Patent No. 694,407, dated March 4, 1902.

Application filed April 12, 1901. Serial No. 55,445. (No model.)

*To all whom it may concern:*

Be it known that I, GEORGE E. MCELROY, a citizen of the United States, and a resident of the city, county, and State of New York, have invented new and useful Improvements in Speed-Changing Gear, of which the following is a specification.

My invention relates especially to means for changing the speed and direction of movement in driving mechanism connected with an actuating engine or motor, and has for its object the provision of a simple, compact, and effective construction designed to accomplish these results.

To attain the desired end my invention consists in certain novel and useful combinations or arrangements of parts and peculiarities of construction and operation, all of which will be hereinafter first fully described and then pointed out in the claims.

In the accompanying drawings, forming a part hereof, Figure 1 is a plan view of a device embodying my invention. Fig. 2 is an axial longitudinal sectional view. Fig. 3 is a cross-sectional view at line $x\ x$ of Fig. 2, and Fig. 4 is an end view looking from the right of Fig. 1.

Similar numerals of reference wherever they occur indicate corresponding parts in all the figures.

1 is a motor or engine shaft.

2 and 3 are gear-wheels secured to the shaft 1.

4 is a clutch also secured upon the shaft 1.

5 is the clutch-actuating mechanism provided with a collar 6, arranged to move longitudinally upon the shaft 1 when the lever 7 is forced to the right or left, bringing a finger 8 into or out of engagement with the extremities of a divided ring 9, expanding said ring so as to cause it to act upon or be released from a surface to be hereinafter described.

10 is a fly-wheel upon the shaft 1.

11 is a sprocket-wheel secured to or forming a part of a disk 12, arranged to rotate freely upon the shaft 1.

13 is a second disk, also arranged to rotate freely upon the shaft 1, but connected to the disk 12 by means of bolts or pins 14, (see Fig. 3,) leaving a space between said plates or disks for the accommodation of the fixed gear 2; three intermediate gears 15 mounted upon studs 16 engaging with the disks 12 and 13; and an internal gear 17 which engages with the gears 15 while free to rotate upon seats 18 and 19 near the peripheries of the disks 12 and 13.

20 is a brake-band surrounding the gear 17.

21 is an internal gear formed upon or secured to the disk 13.

22 is a disk, also free to rotate upon the shaft 1, having a ring 23 extending from one side and being provided upon the other side with fixed studs 24, whereon are mounted three intermediate gears 25, corresponding to the gears 15 and having their teeth mesh with the fixed gear 3 upon the shaft 1 and with the internal gear 21.

26 is a brake-band encircling the ring 23, extending from the disk 22.

When constructed and arranged in accordance with the foregoing description, the operation of my device is as follows: The shaft 1 being given rotation by the motor or engine connected therewith and it being desired to drive the sprocket forward at a slow speed, the internal gear 17 is held against rotation or movement by means of the brake-band 20. The teeth of the fixed gear 2 engage with the intermediate gears 15, which in turn engage with the fixed internal gear 17, and the rotation of the shaft 1 causes the disks 12 and 13, carrying the sprocket 11, to rotate at a slow speed.

To obtain a backward or opposite movement to that above described, the brake-band 26 is tightened upon the ring 23, forming a part of the disk 22, holding said disk against rotation. The teeth of the gear 3, fixed upon the shaft 1, mesh in the intermediate gears 25, which in turn mesh in the internal gear 21, connected to the sprocket-wheel 11 through the medium of the disks 13 and 12, causing a backward rotation of the sprocket to the slow forward movement above explained. When it is desired to drive the sprocket 11 ahead at full speed, the clutch is caused to engage with the ring 23, locking the gears 3, 25, and 21 together, causing all of the parts to rotate with the speed of the shaft 1.

Having now fully described my invention, what I claim as new therein, and desire to secure by Letters Patent, is—

In a device of the character herein specified, the combination with the driving-shaft, two gear-wheels and a clutch fixed thereon, of a disk 22 provided with a brake-ring 23 projecting from the face thereof; a brake arranged to engage the periphery of said ring, the clutch engaging within the ring; the studs secured to said disk and three intermediate gears carried thereby; a disk 13 provided with internal gear 21; a disk 12 pinned to the disk 13; three intermediate gears located upon studs engaging with the disks 12 and 13; an internal gear 17; a brake-band around the periphery of the said internal gear, and a sprocket-wheel connected to the disk 12, substantially as shown and described.

Signed by me at New York this 14th day of March, 1901.

GEORGE E. McELROY.

Witnesses:
A. M. PIERCE,
JAMES RIDGWAY.